(12) United States Patent
Goinski

(10) Patent No.: US 7,316,560 B2
(45) Date of Patent: Jan. 8, 2008

(54) TOOL INSERT FOR THE INITIAL CUT OF A HOT PASSAGE NOZZLE FOR AN INJECTION MOLDING MACHINE

(75) Inventor: Michael Goinski, Rodgau (DE)

(73) Assignee: Incoe Corporation, Troy, MI (US)

( * ) Notice: Subject to any disclaimer, the term of this patent is extended or adjusted under 35 U.S.C. 154(b) by 335 days.

(21) Appl. No.: 11/160,788

(22) Filed: Jul. 8, 2005

(65) Prior Publication Data
US 2006/0024402 A1 Feb. 2, 2006

(30) Foreign Application Priority Data
Jul. 10, 2004 (DE) .................. 10 2004 033 469

(51) Int. Cl.
B29C 45/72 (2006.01)
(52) U.S. Cl. .................. 425/547; 264/328.15; 425/549
(58) Field of Classification Search ................ 425/547, 425/548, 549, 572; 264/328.15
See application file for complete search history.

(56) References Cited
U.S. PATENT DOCUMENTS 4,622,001 A * 11/1986 Bright et al. ............... 425/549
5,055,025 A * 10/1991 Muller ....................... 425/548
5,122,050 A * 6/1992 Gellert ....................... 425/549
6,394,785 B1 * 5/2002 Ciccone ..................... 425/549

* cited by examiner

Primary Examiner—Tim Heitbrink
(74) Attorney, Agent, or Firm—John A. Artz; Dickinson Wright PLLC

(57) ABSTRACT

Tool insert for the initial cut of a hot-passage nozzle for an injection molding machine, which tool insert (10) accommodates the anterior (tool side) part of a nozzle and is insertable in turn in a suitably dimensioned recess (21) of the tool (20), which tool insert (10) consists of an anterior cylindrical fitted part (11) having a flow passage (11a) and a receiving head (12) for the tip of the nozzle. At least two cavities (chambers) (23) separated from each other are present between the outer wall (12a) of the receiving head (12) of the tool insert (10) and the wall of the recess (21) in the tool (20), one of which cavities (23) communicates with the supply passage (31) for a coolant, present in the tool, and the other cavity communicates with the discharge passage (32) for the coolant, present in the tool. Also, at least one flow connection is provided between the two cavities (23), preferably located as far as possible from the openings of the coolant passages (31, 32) in the tool.

14 Claims, 4 Drawing Sheets

TOOL INSERT FOR THE INITIAL CUT OF A HOT PASSAGE NOZZLE FOR AN INJECTION MOLDING MACHINE

TECHNICAL FIELD

The present invention relates to a tool insert for the initial cut of a hot passage nozzle for an injection molding machine.

BACKGROUND

In injection molding, hot melt is injected from an injection molding machine into the tool (injection mold), either directly or by way of a hot-passage manifold system by means of a hot-passage nozzle. The tool consists of an injection side, accommodating the hot-passage nozzle, in which the outer mold (cavity) of the synthetic part to be molded is typically located, and an injector side with the inner mold (core). The region in which the hot-passage nozzle meets the tool and the synthetic part is referred to as the 'initial cut.' The anterior, tool-side part of the hot-passage nozzle with the initial cut region extends, in injection molding, into a recess of the tool. In the posterior region, the nozzle is supported axially on the hot-passage manifold block and is fixed to the anterior, initial cut part by means of precision seal in the tool. There, the nozzle is exposed to high mechanical and thermal stresses.

Since the initial cut region of the nozzle is consequently subject to rapid wear, it is not configured as an integral part of the hot-passage nozzle, but as a replaceable tool insert. Of importance in injection molding is a thermal separation between nozzle and tool. The melt injected into the tool is to solidify quickly, while the melt retained in the tip of the nozzle is to remain liquid. Hence it is known that the tool insert may be cooled by means of a coolant, for example water. For this purpose, diametrally opposed in the tool, a supply and a discharge passage for a coolant supplied to the tool open at the wall of the generally cylindrical recess in the tool, and the tool insert is provided at its outside on the level of the two said passages with an annular groove by way of which the coolant can flow from the supply passage to the discharge passage.

SUMMARY OF THE INVENTION

An object of the present invention is to provide an improved tool insert with improved cooling compared to presently known manners of cooling.

To accomplish this object, a tool insert for the initial cut of a hot-passage nozzle for an injection molding machine is provided, the tool insert accommodating the anterior (tool side) part of a nozzle, and which is insertable in a suitably dimensioned recess of the tool. The tool insert has an anterior cylindrical fitted part having a flow passage and a receiving head for the tip of the nozzle. At least two cavities (chambers) are present between the outer wall of the receiving head of the tool insert and the wall of the recess in the tool. One cavity is in communication with the supply passage for a coolant, present in the tool, and the other cavity is in communication with the discharge passage present in the tool for the coolant. Also, at least one flow connection is present between the two cavities, preferably located as far as possible from the openings of the said coolant passages in the tool.

By the invention, through the cavities or chambers created between the receiving head of the tool insert and the recess in the tool, spaces are formed with large adjoining surfaces of the receiving head, at which the coolant flows past. In this manner, a more intensive cooling is achieved than tool inserts in which the coolant bathes only a small part of the surface of the receiving head. The cavities may be for example obtained by flattenings on the outer wall of the cylindrical receiving head of the tool insert. Also, the flow connection between neighboring cavities or chambers preferably occurs as great a distance as possible from the supply and discharge passages for the coolant in the tool. In addition, the edges of the cutting projections can be blunted by a slight flattening or rounding.

BRIEF DESCRIPTION OF THE DRAWINGS

The invention will be further illustrated in terms of the embodiments shown in the figures by way of example. In the drawings.

DESCRIPTION OF THE PREFERRED EMBODIMENTS

Figure 1:
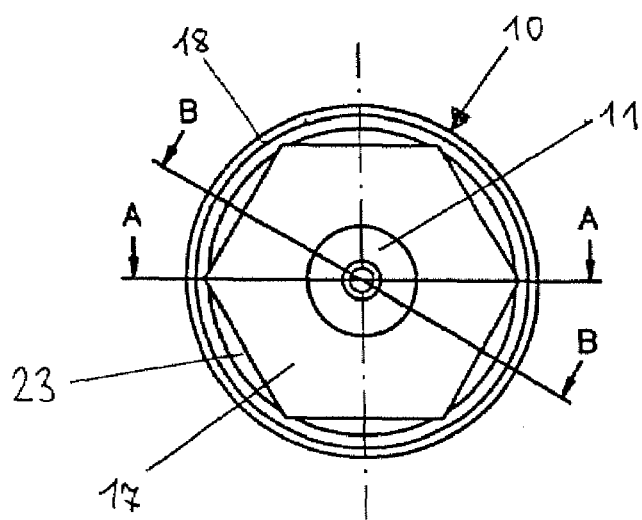
FIG. 1 shows a first embodiment by way of example of a tool insert according to the invention in top view, seen from the side of the tool.
Figure 2:
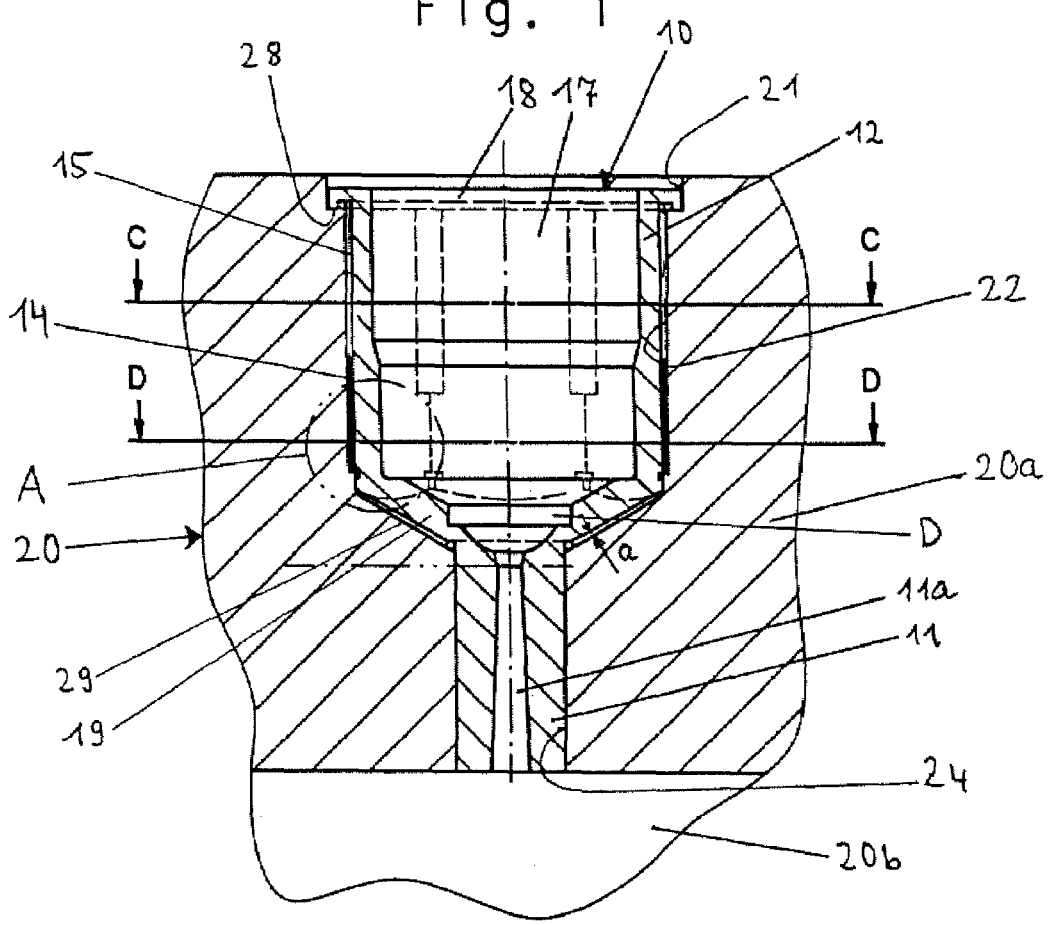
FIG. 2 shows the tool insert according to FIG. 1 inserted in a tool, in section at the line A-A in FIG. 1.

In FIG. 2, 20 designates a section of the tool (mold). Here, 20a designates the wall of the injection side of the tool and 20b the cavity. The tool insert 10 consists of a cylindrical fitted part 11 with flow passage 11a for the melt and a receiving head 12 to accommodate an injection nozzle not shown. In the tool itself, there is a recess 21 consisting of a fitted bore 24 to accommodate the fitted part 11 and a receiving bore 22 to accommodate the receiving head 12 of the tool insert. The seal between the nozzle not shown and the tool insert is made by the cylindrical surfaces, designated D in FIG. 2, of the tool insert 10 and the nozzle. Both in the tool recess 21 and on the tool insert 10, there is a transition from the upper cylindrical part 22, 12, in the sense of FIG. 2, to the lower cylindrical part 24, 11, as a rule by way of a transition part 19, 29 in the shape of a truncated cone (see also FIG. 6).

The axial end location of the tool insert in the tool is determined by the cooperation of a flange 18 at the end of the tool insert away from the tool and by the depth of a correspondingly dimensioned, enlarged offset 28 at the entrance of the tool recess 21. Between the flange 18 and its lodgment on the enlarged offset 28, there is a seal not shown. The axial end position of the tool insert is so dimensioned that upon lodgment of the flange 18 on the offset 28, a certain gap a (FIGS. 2 and 6) remains present between the truncated cone shaped transition part 19 of the tool insert and the bottom 29 of the receiving bore 22. In this way, besides the effect described in the following, a thermal separation and a statically determined contact of the tool insert in the tool recess 21 is achieved.

Figure 4:
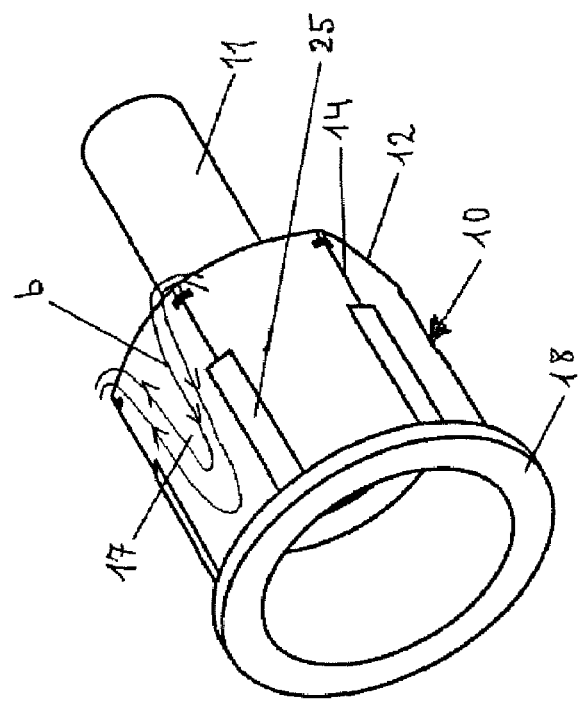
FIG. 4 is a perspective view of the tool insert according to FIGS. 1-3.
Figure 3:
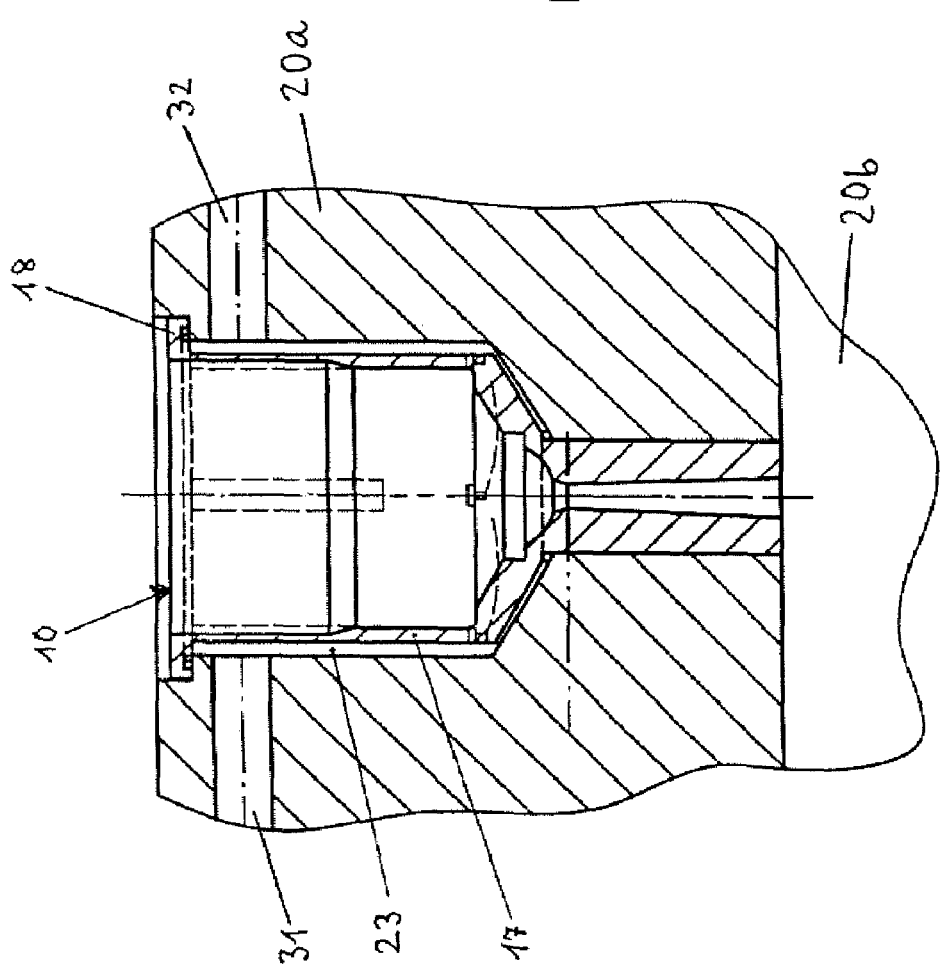
FIG. 3 shows the tool insert according to FIG. 1 inserted in a tool, in section at the line B-B in FIG. 1.
Figures 5A, 5B:
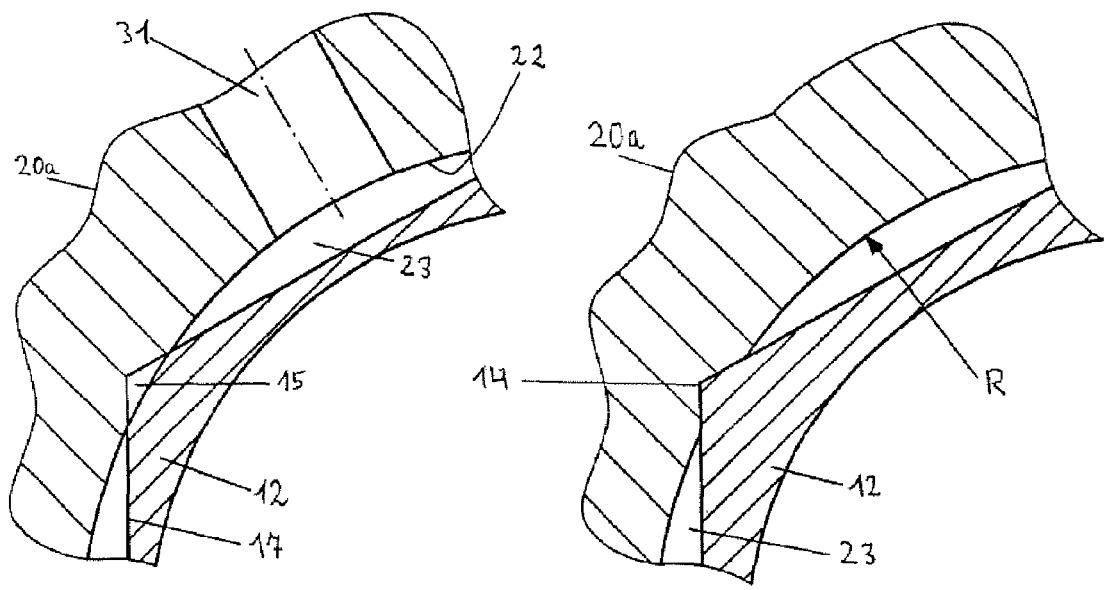
FIG. 5a shows in enlarged form a detail in section at the line C-C in FIG. 2.
FIG. 5b shows in enlarged form a detail in section at the line D-D in FIG. 2.
Figure 5C:
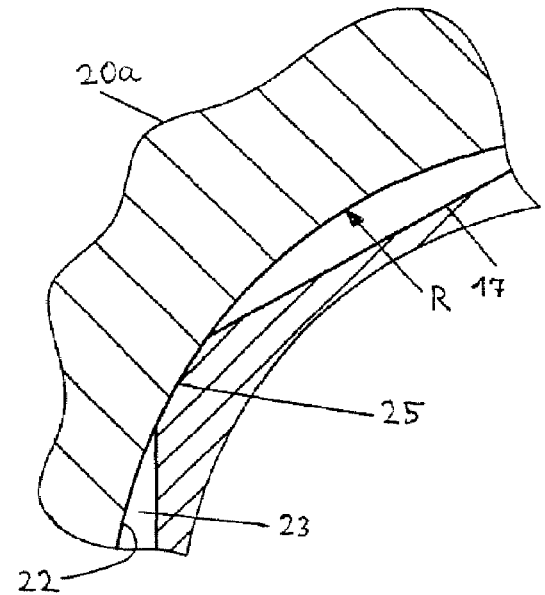
FIG. 5c shows a second embodiment of the invention, representing a modification of the embodiment shown in FIGS. 1 to 5b.

In the embodiment of the invention shown by way of example in FIGS. 1 to 5b, with the exception of the flange 18, the normally cylindrical outer periphery 12a of the receiving head 12 is configured throughout its length as a regular hexagonal cylinder 17 (see FIGS. 4, 5a and 5b). Thus, six cavities or chambers 23 are formed between the cylindrical wall of the receiving bore 22 and the hexagonal cylinder, separated from each other in peripheral direction and essentially sealed off from each other. Of two diametrally opposed chambers 23, the one, preferably central and upper, adjoins the supply passage 31 provided for the coolant in the tool, and the other adjoins the discharge passage 32 for the coolant.

The mutual separation of the chambers 23 may for example be achieved in that the diameter of the hexagonal cylinder, measured between two diametrally opposed edges, is taken larger than the diameter R of the receiving bore 22 (see FIG. 5b). Then the hexagonal cylinder can be turned down to the diameter R of the receiving bore, so that the chambers 23 adjacent to the narrow cylindrical surfaces 25 extending in lengthwise direction of the hexagon that have been turned down (see FIG. 5c) are separated from each other and also to a large extent sealed off from each other.

The turning down of the edges 14 to be seen in FIG. 5b, however, may be dispensed with in whole or in part. This is the case of the embodiment shown by way of example in FIGS. 1 to 5b. The diameter of the hexagonal cylinder here chosen, measured between two diametrally opposed edges, is only slightly greater, for example 0.2 mm greater, than the diameter R of the receiving bore 22, so that on the outside of the receiving head, projections 14 are formed, protruding into the inner wall of the receiving bore 22. This has the consequence that upon first-time insertion of the tool insert 10 in the tool recess 21, the edges (projections) of the hexagonal cylinder extending in lengthwise direction of the receiving head 12, enter into the material of the injection side of the tool, and cut or plane guide grooves 15 in the wall of the receiving bore 22.

If after disassembly of the tool insert, it or a new tool insert provided with corresponding projections is inserted in the tool recess 21, then the desired angular position of the tool insert is exactly preassigned by the guide grooves 15 already cut. The defined rotational position has the advantage that supply passage 31 and discharge passage 32 always assume the same favorable positions relative to the chamber 23 adjoining in each instance. Furthermore, an exactly defined rotational position is required when the transition between the fitted part 11 and the cavity 20b runs oblique with respect to the lengthwise axis of the tool insert (not shown). In principle, a single projection on the receiving head, cutting into the wall of the receiving bore, will suffice to achieve these advantages.

In the embodiment shown by way of example, a connection between the six chambers 23 exists only by way of the gap "a" between the truncated cone transition part 19 and the truncated cone bottom of the receiving head 12 (FIG. 2). Investigations have shown that upon supply of coolant by way of the supply passage 31, it flows into a chamber 23, areally downward therein to the gap "a", then into the two neighboring chambers, practically up to their upper limitation, and back again, as indicated by the arrow lines "b" in FIG. 4, and then into that chamber which is adjoined by the discharge passage 32 for the coolant. In this way, a highly effective cooling of the tool insert is achieved.

Of course, the connection between neighboring chambers, instead of by way of the gap "a", can be created in that at one or more suitable points, the edges of the hexagon are taken back so far over a certain axial length that a throughflow gap is formed between neighboring chambers. However, the cooling is especially intensive if the supply passage 31 and the discharge passage 32 lie as far up as possible in the sense of FIG. 2, and the connections between the chambers as far down as possible in the sense of FIG. 2, viz. in the neighborhood of the gap "a".

In order to minimize the force required for the first-time insertion of the tool insert in the tool, in the embodiment of FIGS. 1 to 5b by way of example, the unremoved edge 14 extends only over a lower segment 17a, in the sense of FIG. 2, of the receiving head 12. FIGS. 5a and 5b show the resulting structure in the upper and lower parts of the receiving bore 22 with tool insert inserted. As FIG. 5a shows, in the upper part the separation and adequate seal between neighboring chambers takes place essentially over the length of two lines of contact between the injection side of tool and tool insert.

Figure 6:
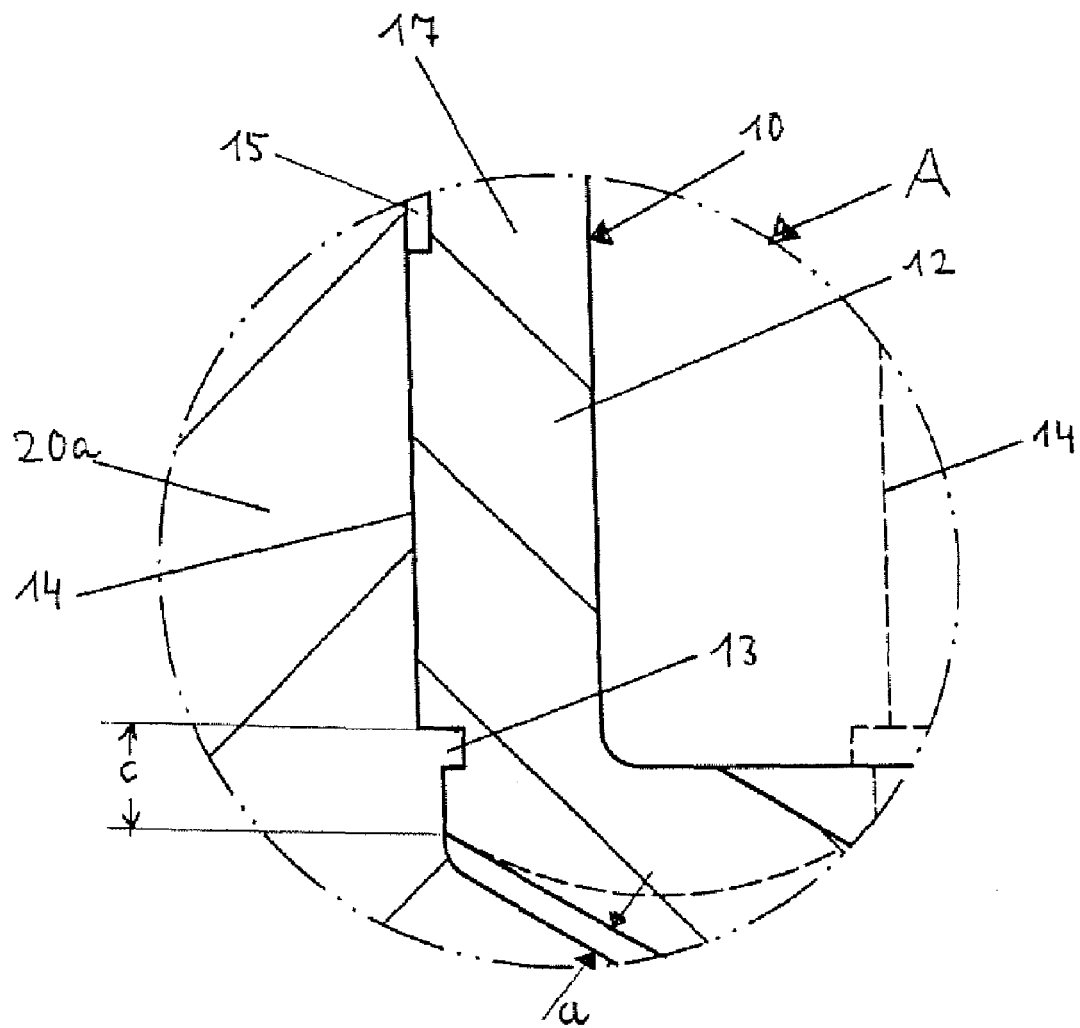
FIG. 6 shows a third embodiment of the invention, differing only in the region of the circle A in FIG. 2 from the embodiment shown in FIGS. 1 to 5b.

FIG. 6 shows a further development of the embodiment shown in FIGS. 1 to 5b. Here, the edges 14 of the hexagonal cylinder are also removed by a small amount "c" at the lower end of the receiving head 12 in the sense of the drawing. This has the advantage that when inserting the tool insert 10 in the recess 21 in the tool, it is a simple matter to obtain good centering. When the cutting edge 14 starts, the cylindrical fitted part 11 as a rule has not yet reached the corresponding receiving bore 24, so that without the segment "c", it is possible to have a non-concentric positioning of the receiving head 12 in the receiving bore 22.

Furthermore, in FIG. 6, at the lower end of the cutting edge projections 14, a groove 13 is provided. The groove 13 serves first to obtain a sharp cutting edge start and secondly to accommodate the chip that results from cutting the guide groove.

The invention is not limited to the embodiments shown by way of example but may be modified in many ways within the scope of the claims. Thus, the regular hexagonal cylinder 17 shown in the figures may be replaced by any other regular or irregular polygonal cylinders.

In principle, the idea of the invention is already realized by two cavities (chambers) of any kind between the wall of the receiving bore 22 and the receiving head 12 of the tool insert, one of which is in connection with the coolant supply passage 31 and the other with the coolant discharge passage 32, the two cavities being in communication with each other by way of a flow passage preferably offset in its vertical position from the vertical position of the supply and discharge passages. In principle, the cavity may be formed in whole or in part by removal of material from the inner wall of the receiving bore 22 present in the tool.

Further details, benefits and features of the present invention will become available from the following description when taken in connection with the accompanying drawings.

What is claimed is:

1. Tool insert for the initial cut of a hot-passage nozzle for an injection molding machine, which tool insert (10) accommodates the anterior (tool side) part of a nozzle, and in turn is insertable in a suitably dimensioned recess (21) of a tool (20), which tool insert (10) consists of an anterior cylindrical fitted part (11) having a flow passage (11a) and a receiving head (12) for the tip of the nozzle, characterized in that at least two cavities (chambers) (23) are present between the outer wall (12a) of the receiving head (12) of the tool insert (10) and the wall of the recess (21) in the tool (20), of which at least one cavity (23) is in communication with the supply passage (31) for a coolant, present in the tool, and the other cavity is in communication with the discharge passage (32) present in the tool for the coolant, and in that at least one flow connection is present between the at least two cavities (23), preferably located as far as possible from the openings of the said coolant passages (31, 32) in the tool.

2. The tool insert according to claim 1, wherein the recess (21) in the tool has a cylindrical segment (receiving bore) (22) to accommodate the substantially cylindrical receiving head (12) of the tool insert (10) and wherein said cavities (23) are formed by flattenings of the cylindrical receiving head.

3. The tool insert according to claim 1 wherein the receiving head (12) at least along a portion of its length is configured as a regular or irregular polygonal cylinder (17), with the edges (14) of the polygonal cylinder forming the boundaries between neighboring cavities (23).

4. The tool insert according to claim 2 wherein the receiving head (12) at least along a portion of its length is configured as a regular or irregular polygonal cylinder (17), with the edges (14) of the polygonal cylinder forming the boundaries between neighboring cavities (23).

5. The tool insert according to claim 1 wherein the receiving head (12), at least along a portion of its length, is configured as a regular or irregular polygonal cylinder (17), the radius of the polygonal cylinder at the edge location being greater than the radius (R) of the receiving bore (22), but these edges being taken back to the radius (R) of the receiving bore (22).

6. The tool insert according to claim 2 wherein the receiving head (12), at least along a portion of its length, is configured as a regular or irregular polygonal cylinder (17), the radius of the polygonal cylinder at the edge location being greater than the radius (R) of the receiving bore (22), but these edges being taken back to the radius (R) of the receiving bore (22).

7. The tool insert according to claim 3, wherein the polygonal cylinder is a regular hexagon.

8. The tool insert according to claim 1 wherein said connection between the cavities (23) comprises a segment of reduced diameter of the cylindrical receiving head (12) or a gap distance (a) between a truncated cone transition part (19) of the receiving head (12) to the cylindrical fitted part (11) and the corresponding truncated cone shaped bottom of the recess (21).

9. The tool insert according to claim 1 wherein the receiving head (12) has at least one cutting projection (14) on its outer wall (12a), wherein when the tool insert (10) is inserted in the recess (21) in the tool, a guide groove (15) can be cut into the inner wall of the receiving bore (22) in the tool.

10. The tool insert according to claim 1 wherein cutting projections are formed by the edges (14) of the polygonal cylinder in that the radius of the polygon is greater at the edge location than the radius (R) of the receiving bore (22).

11. The tool insert according to claim 9 wherein the edges of the cutting projections (14) are flattened and lie substantially on the circumference of a circle.

12. The tool insert according to claim 10 wherein the edges of the cutting projections (14) are flattened and lie substantially on the circumference of a circle.

13. The tool insert according to claim 1 wherein the cutting projections (14) are formed by the edges (14) extend only along a portion of the cylinder receiving head (12) directed towards the tool.

14. The tool insert according to claim 13 wherein said cutting projections comprise at least one segment adjacent the end of the receiving head (12) directed towards the tool.

* * * * *